(12) United States Patent
Rennig et al.

(10) Patent No.: US 11,526,458 B2
(45) Date of Patent: Dec. 13, 2022

(54) METHOD OF OPERATING A COMMUNICATION BUS, CORRESPONDING SYSTEM, DEVICES AND VEHICLE

(71) Applicants: STMicroelectronics Application GMBH, Aschheim-Dornach (DE); STMICROELECTRONICS DESIGN AND APPLICATION S.R.O., Prague (CZ)

(72) Inventors: Fred Rennig, Nandlstadt (DE); Vaclav Dvorak, Mratín (CZ); Ludek Beran, Strancice (CZ)

(73) Assignees: STMICROELECTRONICS APPLICATION GMBH, Aschheim-Dornach (DE); STMICROELECTRONICS DESIGN AND APPLICATION S.R.O, Prague (CZ)

( * ) Notice: Subject to any disclaimer, the term of this patent is extended or adjusted under 35 U.S.C. 154(b) by 0 days.

(21) Appl. No.: 17/245,894

(22) Filed: Apr. 30, 2021

(65) Prior Publication Data
US 2021/0357344 A1 Nov. 18, 2021

(30) Foreign Application Priority Data

May 18, 2020 (IT) .................. 102020000011479

(51) Int. Cl.
*G06F 13/362* (2006.01)
*G06F 11/07* (2006.01)
(Continued)

(52) U.S. Cl.
CPC .......... *G06F 13/362* (2013.01); *G06F 11/076* (2013.01); *G06F 11/0739* (2013.01);
(Continued)

(58) Field of Classification Search
CPC .............. G06F 13/362; G06F 13/4252; G06F 11/0739; G06F 11/076; G06F 11/0793;
(Continued)

(56) References Cited

U.S. PATENT DOCUMENTS 10,250,376 B2 * 4/2019 Hooper .................. H04L 12/40
10,313,152 B2 * 6/2019 Kishigami .......... H04L 25/0272
(Continued)

FOREIGN PATENT DOCUMENTS

EP  3541031 A1  9/2019
EP  3547620 A1  10/2019

OTHER PUBLICATIONS

"CAN FD Light—A novel communication bus supporting digitalization and customization of automotive lighting for the broad market"—Jochen Barthel, Marianna Sanza, Fred Renning, and Donato Tagliavia, 5 pages, Dated Jul. 2-4, 2019 (Year: 2019).*
(Continued)

*Primary Examiner* — Brian T Misiura
(74) *Attorney, Agent, or Firm* — Slater Matsil, LLP

(57) ABSTRACT

An embodiment method of operating a CAN bus comprises coupling a first device and second devices to the CAN bus via respective CAN transceiver circuits, and configuring the respective CAN transceiver circuits to set the CAN bus to a recessive level during transmission of messages via the CAN bus by the respective first device or second devices.

20 Claims, 4 Drawing Sheets

(51) Int. Cl.
  *H04L 12/40* (2006.01)
  *H04L 7/00* (2006.01)
  *H04L 5/00* (2006.01)
  *G06F 13/42* (2006.01)
  *H04L 43/55* (2022.01)

(52) U.S. Cl.
  CPC ...... *G06F 11/0793* (2013.01); *G06F 13/4252* (2013.01); *H04L 5/006* (2013.01); *H04L 7/0008* (2013.01); *H04L 7/0016* (2013.01); *H04L 12/40019* (2013.01); *H04L 43/55* (2022.05); *H04L 2012/40215* (2013.01); *H04L 2012/40273* (2013.01)

(58) Field of Classification Search
  CPC ..... H04L 5/006; H04L 7/0008; H04L 7/0016; H04L 12/40019; H04L 41/5038; H04L 2012/40273; H04L 2012/40215
  See application file for complete search history.

(56) References Cited

U.S. PATENT DOCUMENTS

| | | | |
|---|---|---|---|
| 10,678,726 B2 * | 6/2020 | Rennig | H04L 12/403 |
| 2007/0294443 A1 * | 12/2007 | Berenbaum | G06F 13/42 |
| | | | 710/110 |
| 2014/0156887 A1 | 6/2014 | Hartwich | |
| 2016/0234038 A1 | 8/2016 | Mounier et al. | |
| 2017/0070366 A1 * | 3/2017 | Hehemann | H04L 25/0286 |
| 2017/0155225 A1 * | 6/2017 | Villeneuve | H01S 3/06758 |
| 2019/0294572 A1 * | 9/2019 | Rennig | G06F 11/0772 |

OTHER PUBLICATIONS

Autosar, "E2E Protocol Specification", Autosar FO R19-11, ID No. 849, Nov. 28, 2019, 185 pages.

* cited by examiner

FIG. 9
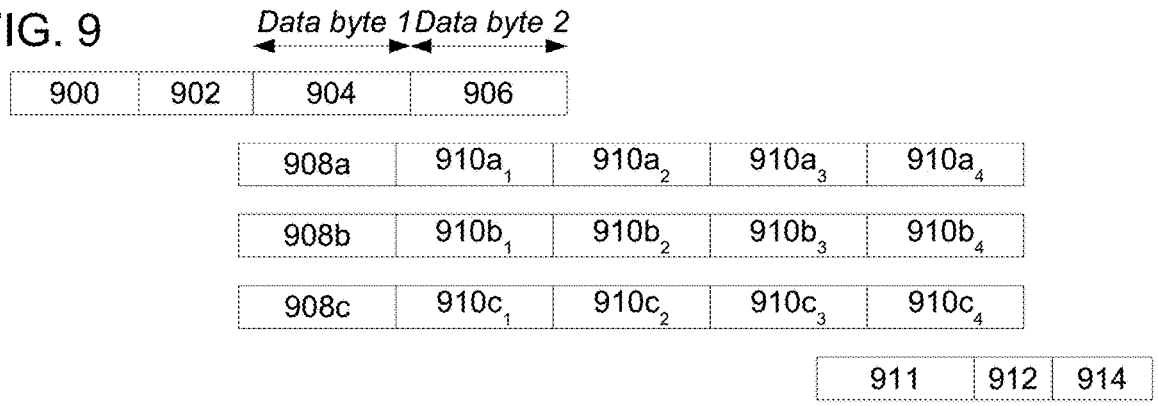
FIG. 10
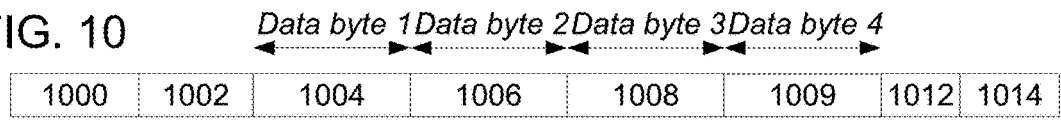
FIG. 11
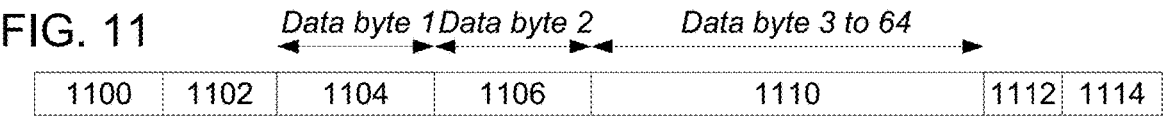
FIG. 12
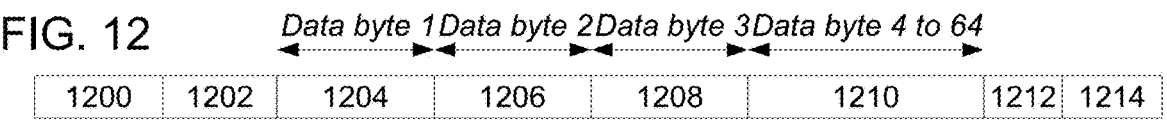
FIG. 13
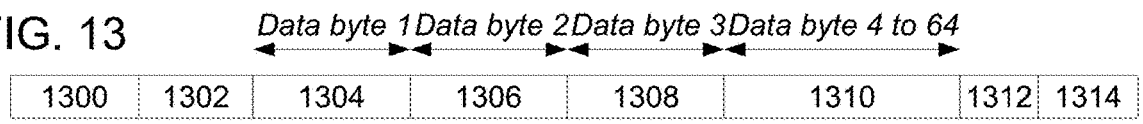
FIG. 14
| 1400 | 1402 | 1412 | 1414 |
FIG. 16
| 1600 | 1602 | 1612 | 1614 |
FIG. 15
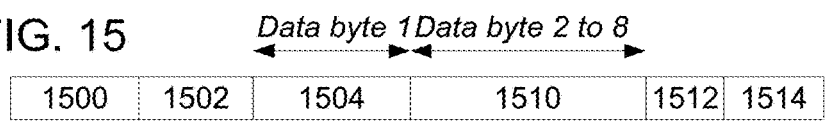

METHOD OF OPERATING A COMMUNICATION BUS, CORRESPONDING SYSTEM, DEVICES AND VEHICLE

CROSS-REFERENCE TO RELATED APPLICATIONS

This application claims the benefit of Italian Patent Application No. 102020000011479, filed on May 18, 2020, which application is hereby incorporated herein by reference.

TECHNICAL FIELD

The description relates to bus-supported communication for use in automotive applications. For instance, one or more embodiments may be applied to communication between an electronic control unit (ECU) of a vehicle and one or more actuator devices and/or sensor devices of the vehicle.

BACKGROUND

Various applications in the automotive field involve exchange of data via a bus network. High data rate, robustness, fault detection, safety and low cost are desirable features for such bus networks.

Existing high data rate (e.g., 1 Mb/s) standardized vehicle communication systems may involve complex and accurate protocol controllers, e.g., using external components. These may turn out to be expensive, especially when implemented as single chip analog/bipolar Application Specific Integrated Circuits (ASICs) or Application Specific Standard Products (ASSPs).

Vehicle lights (e.g., front, rear, and interior lights) are becoming increasingly sophisticated and distributed (e.g., Matrix light emitting diode (LED), ambient LED). Controlling such sophisticated and distributed lighting systems may rely on high data rate bus systems. Moreover, automotive-grade safety and robustness are desirable, especially for front and rear lighting systems.

Therefore, solutions are known in the art which may rely on the use of a CAN (Controller Area Network) bus, optionally according to a CAN FD protocol, for managing the communication between one or more ECUs and driver circuits for lighting modules according to a master-slave communication scheme. Documents EP 3547620 A1 and US 2019/0294572 A1 are exemplary of such known solutions.

SUMMARY

Despite the extensive activity in the area, further improved solutions are desirable.

For instance, solutions are desirable which may provide improved immunity against electro-magnetic interference (EMI) in a bus communication system.

An object of one or more embodiments is to contribute in providing such improved solutions.

According to one or more embodiments, such an object can be achieved by means of a method having the features set forth in the claims that follow.

One or more embodiments may relate to corresponding devices, e.g., master and slave (interfaces) intended to work together.

One or more embodiments may relate to a corresponding system.

One or more embodiments may relate to a corresponding vehicle, e.g., a motor vehicle such as a motor car.

The claims are an integral part of the technical teaching provided herein in respect of the embodiments.

According to one or more embodiments, it is provided a method comprising coupling a first device and a set of second devices to a CAN communication bus via respective CAN transceiver circuits to exchange messages over the CAN communication bus. The method may comprise configuring the first device as a communication master device to transmit via the CAN communication bus first messages carrying a set of operation data message portions indicative of operations for implementation by second devices in the set of second devices, and second messages addressed to second devices in the set of second devices. The second messages may convey identifiers identifying respective ones of the second devices to which the second messages are addressed, requesting respective reactions towards the first device within respective expected reaction intervals. The method may comprise configuring the second devices in the set of second devices as communication slave devices to receive via the CAN communication bus the first messages transmitted from the first device, read respective operation data message portions in the set of operation data message portions and implement respective operations as a function of the respective operation data message portions read, and to receive via the CAN communication bus the second messages transmitted from the first device and react thereon within the respective expected reaction intervals by transmitting via the CAN communication bus reaction messages towards the first device configured as communication master device. The method may comprise configuring the respective CAN transceiver circuits to (e.g., selectively) set the CAN communication bus to a recessive level (e.g., a logic 1) during transmission of the messages via the CAN communication bus by the respective first device or second device.

Therefore, one or more embodiments may provide improved symmetry of the driven bit and increased immunity against electro-magnetic interference in a bus communication system for use, e.g., in the automotive sector.

BRIEF DESCRIPTION OF THE DRAWINGS

One or more embodiments will now be described, by way of example only, with reference to the annexed figures, wherein:

FIGS. 5 to 16 are exemplary of the content of various types of frames in one or more embodiments.

DETAILED DESCRIPTION OF ILLUSTRATIVE EMBODIMENTS

Figure 1:
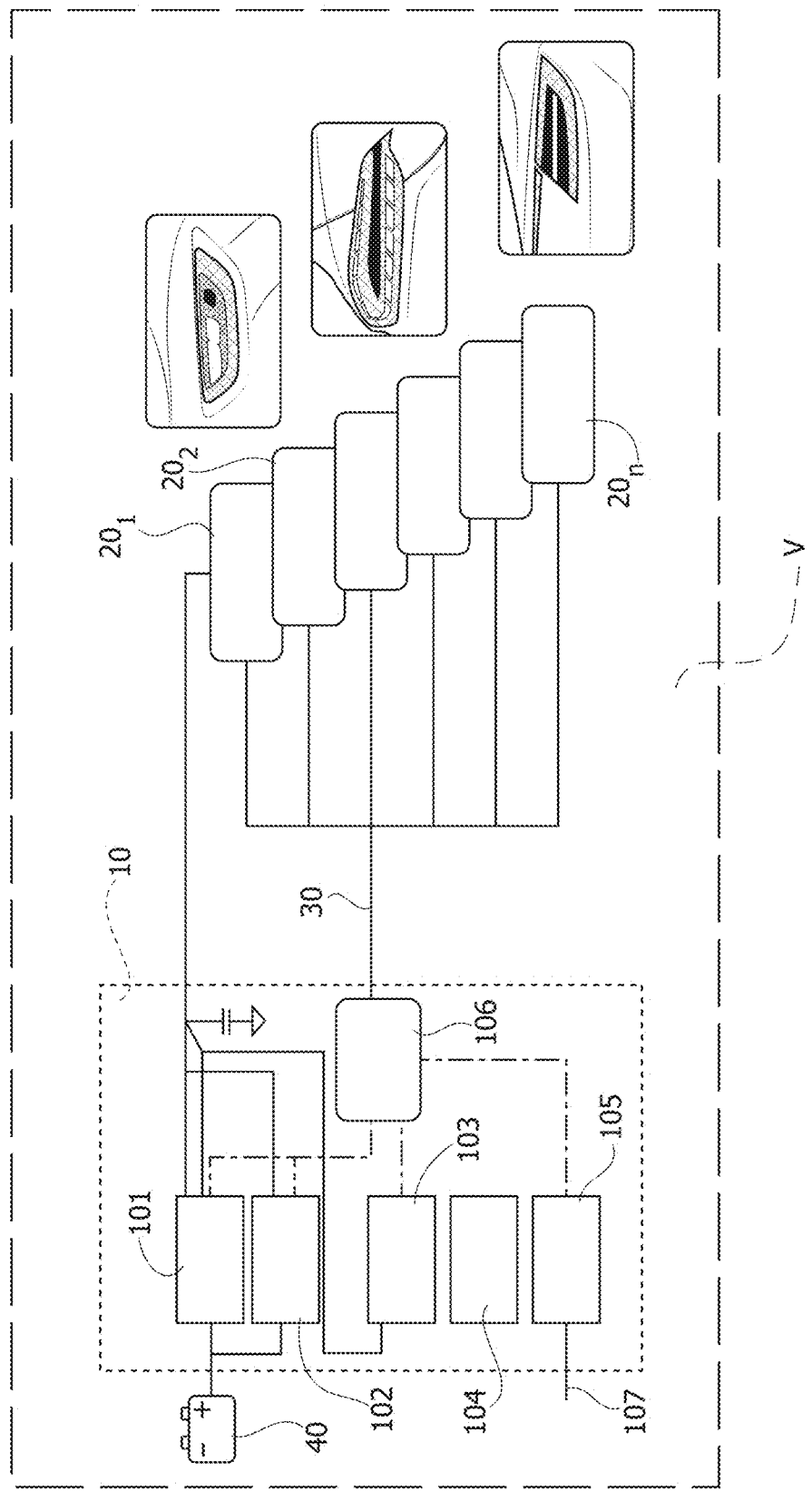
FIG. 1 is exemplary of a bus communication system according to one or more embodiments.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

Throughout the figures annexed herein, like parts or elements are indicated with like references/numerals and a corresponding description will not be repeated for brevity.

The headings/references used herein are provided merely for convenience and hence do not define the extent of protection or the scope of the embodiments.

The increasing computation power of automotive microcontrollers and the development of high data rate networks may provide for data processing and controlling being combined in single electronic control units (ECU). It is noted that such electronic control units configured to perform data processing and device control may be located close to the area where actuators and sensors are placed in the vehicle, e.g., to implement so-called "zone controllers". Such zone controllers may be placed in various areas (zones) of a vehicle and may be connected to one or more central ECUs by a high bandwidth network, e.g., an Ethernet network. The zone controllers may be capable of collecting sensor data and driving actuators, e.g., with a high time resolution. Processing of data collected from the sensors and/or addressed to the actuators can therefore be performed in the zone controllers, without the need of providing dedicated processing circuits arranged locally on the same circuit board(s) which hosts the sensor(s) and/or the actuator(s). The network connection between the actuators and/or sensors on one side and the (zone) controllers on the other side is not restricted to a dedicated component but can be routed through the vehicle, therefore a robust, reliable and trusted network may be desirable.

An exemplary application in which the "zone controller architecture" may be implemented relates to controlling the lights of a vehicle, e.g., to implement an animated rear light. In addition to the conventional functions such as turn indicator, brake indicator and tail light, such an application may provide additional features such as the ability to inform and warn the traffic behind the vehicle, as well as animations for design and branding. Such functions and/or animations may be realized by controlling hundreds of individual light sources (e.g., LED light sources) which may be dynamically activated with a high resolution of individual intensity. Additionally, diagnosis data may be obtained cyclically from the LED drivers to provide short reaction times on failures.

The above-exemplified application may rely, for instance, on the adaptation of a CAN protocol (e.g., a CAN FD protocol) to support one or more additional functions.

For instance, a CAN protocol may be adapted to a master-slave communication architecture, as it is known from documents EP 3547620 A1 and US 2019/0294572 A1 previously cited, which are hereby incorporated by reference.

Therefore, one or more embodiments may relate to a robust master-slave communication bus interface that can be used under automotive conditions, which in the following may be referred to with the designation "CAN FD Light". Such CAN FD Light protocol may use the CAN FD physical interface and protocol (therefore, a differential bus wiring) and may provide a defined edge density for synchronization. For safety reasons, cyclic redundancy check (CRC) and error checking may be implemented. The communication master may be implemented as a zone controller using the protocol controller in the microcontroller and a CAN FD transceiver. The communication slaves may be located in the LED satellites.

It is noted that, while reference to a CAN FD protocol may be extensively made in the present description for the sake of example only, one or more embodiments may be applied to different types of CAN protocols such as, for instance, the CAN XL protocol.

One or more embodiments may relate to a bus system as exemplified in FIG. 1. The bus system may comprise a communication master device 10 and a set of communication slave devices $20_1, 20_2, \ldots, 20_n$ coupled via a bus 30 and supplied with power from a power source 40, e.g., a battery provided in a vehicle V. The master device may be implemented in an electronic control unit (ECU) configured to control at least one lighting device (e.g., a LED lighting device) such as a front light, a rear light or an interior light of the vehicle V.

It is noted again that reference to a lighting system in a vehicle is made by way of example only. A communication architecture as disclosed herein may generally be applied to any communication system in a vehicle, comprising a "zone controller" or "domain controller" which is configured to process data and control actuators, and a set of sensors/actuators coupled to the zone controller via a bus network. For instance, one or more embodiments may rely to a battery management system, or to an advanced driver assistance system.

The master device 10 may comprise a main (e.g., buck) converter 101, an optional (e.g., again buck) converter 102, a low-dropout (LDO) linear voltage regulator, stand by, reset and window, and watchdog circuit block 103, voltage supervisor, power good, oscillator and enable circuit blocks 104, a microcontroller unit 106, an optional transceiver circuit 105 for communication with other ECUs possibly comprised in the vehicle V (e.g., a LIN2.2/HS-CAN transceiver), and an optional access point to an external communication bus 107 connected to the transceiver 105 for communication with other ECUs comprised in the vehicle V.

The microcontroller unit 106 may comprise a protocol controller circuit. The master device 10 may further comprise a CAN FD transceiver (not visible in FIG. 1) configured for coupling to the CAN bus 30.

The slave devices may be implemented as "satellite" devices, e.g., as LED driver circuits.

According to a master-slave communication scheme, in one or more embodiments the slave devices may send messages (or frames) only upon receiving a request from the master device. One or more embodiments may not involve a collision resolving method, since during normal operation collisions can be avoided. A collision can be treated as an error.

In normal operation, the master device may send data messages to the slave devices in defined time intervals. Such data messages can be received by all the slave devices connected to the bus, and the data stream can be used by the slave devices as network heartbeat or watchdog. If a data message is not received at a slave device within a defined time interval, the slave device may enter a fail-safe (or limp-home) mode.

In one or more embodiments, the master device may request diagnosis data from the slave devices using dedicated "unicast" command frames. For instance, only one addressed slave may answer to a diagnosis request frame within a defined time interval. This answer can be used by the master device to detect the availability of the slave devices.

In one or more embodiments, the communication protocol may use CAN FD format frames without bit rate switching and with standard ID. In one or more embodiments, extensions (like supporting extended ID, classic CAN frames or bit rate switching) may be supported. Frames that are not supported by the implementation may be ignored.

In one or more embodiments, during one data frame a master device may be able to send up to 64 data bytes (i.e., 512 bits, 1 byte=8 bits), which can be received by all the devices coupled to the bus (e.g., the "bus participants"). Each slave device can pick from the data bytes (e.g., 512 bits) of a single data frame the information it needs for its operation. This kind of frame may be referred to as a "multicast" data frame. The number of bits that each slave device can pick from a single data frame may be implementation-specific, and the position of the data addressed to each slave device may be determined during an initialization sequence. For instance, if each slave device uses 8 bits of data, up to 64 slave devices can be provided with data per multicast data frame. More than 64 slave devices may be provided in the bus system by configuring them as belonging to different chains of slave devices. These chains can be addressed by respective dedicated IDs in the CAN FD ID field.

In one or more embodiments, each slave device can also be addressed individually using a respective slave address, and the addressed slave device may answer to such an individual message received. The slave ID may be 9-bit long (e.g., SLAVE[8:0]), which may leave the first two bits of the 11-bit CAN FD ID field available to distinguish between multicast frames and unicast frames (e.g., as a function of the value of the most significant bit MSB of the CAN FD ID field), as well as between master requests and slave responses (e.g., as a function of the value of the second most significant bit of the CAN FD ID field, i.e., bit number 10 in the standard CAN ID field).

In one or more embodiments, messages according to the ST SPI 4.1 protocol may be embedded into the data of the diagnosis request and diagnosis response frames in order to allow reading and/or writing specific data to specific addresses in the local memory of the slave devices. Therefore, in one or more embodiments the global status register may be sent back with every diagnosis request.

One or more embodiments may take advantage of the master-slave communication architecture applied to a CAN protocol to operate the bus in absence of arbitration, as opposed to conventional CAN based protocols. Therefore, in one or more embodiments the bus may (e.g., always) be pulled to a recessive level (e.g., logical 1) actively, with an extension of functionality if compared to conventional CAN based protocols, where this is not possible due to arbitration. Between the frames, the bus may not be driven. Thus, one or more embodiments may provide improved symmetry of the driven bit and increase immunity against electro-magnetic interference (EMI).

In conventional CAN/CAN FD transceivers, the bus is not driven actively to recessive while sending data. Therefore, the symmetry may rely significantly on the properties of the bus, such as the cable (e.g., capacitance, inductance, resistance of the cable) and the termination resistor of the wire.

In one or more embodiments, by actively driving the bus in both directions (dominant and recessive) the symmetry and the slopes may be better controlled by the driving circuit. More accurate slopes and symmetry may improve the electro-magnetic emission which comes mainly from asymmetries of the driven signal.

Therefore, in one or more embodiments a slave device can actively pull the bus to a recessive level during transmission of a frame, as a result of the absence of arbitration. In one or more embodiments, a slave device may thus not drive a differential voltage to signal a logical 1 (recessive) to be received by other nodes connected to the very same media while it is not transmitting data. As a result, the bus can be driven to recessive during this time with the same maximum current as applicable for the dominant level (e.g., 115 mA in the case of a CAN or CAN FD transceiver).

In one or more embodiments, a mode for CAN transceivers used (only) during data phase (e.g., in CAN XL protocol) may be used for the entire frame as a result of arbitration not being performed. This may also provide increased EMI robustness and symmetry.

In one or more embodiments, it may be possible to drive a differential voltage to signal a logical 1 (recessive level) while the driver is transmitting data.

Additionally or alternatively, the transceiver may not even be restricted to be a differential driver (for both "0" and "1").

For instance, instead of using CAN FD transceivers or CAN XL transceivers to drive an electrical voltage representing a logic signal, one or more embodiments may rely on the recognition that it may be possible to use any other output driver and input buffer with different characteristics to represent a logic value with an output voltage, e.g., using CMOS output buffers or CMOS input buffers at various voltage levels.

It is noted that, in case arbitration is used without a master-slave communication scheme, the bus works as a "wired-and" connection. This may involve that a voltage representing a logic "0" always overwrites a voltage representing a logic "1" when transmitting data on the bus. In the case of a master-slave implementation, this may be dispensed with insofar as there might be no arbitration that involves a logic "0" driven by a sender device to override a logic "1" driven by another sender device on the bus.

For instance, CMOS drivers may be used sometimes in the place of CAN transceivers for simplicity on very small distances due to the reduced cost. In the case of arbitration, the wired-and connection may be realized by open drain drivers, which may actively drive to 0 V only, while the logic "1" may be passively realized using a pull-up resistor. In the case of a master-slave implementation according to one or more embodiments, it may be possible to also actively drive the voltage representing logic "1".

One or more embodiments may aim at providing end-to-end data protection in such a bus supported communication system, e.g., relying on a CAN protocol (e.g., CAN FD or CAN XL).

To this aim, the devices (e.g., both master devices and slave devices) for use in one or more embodiments may support the AUTOSAR end-to-end (E2E) protection control profile 1C with E2E_P01_DATAID_NIBBLE. This profile is described in Chapter 6.3 of the AUTOSAR E2E Protocol Specification (version 1.5.0 of Oct. 31, 2018), which is hereby incorporated by reference. The corresponding mechanisms are described in Table 6.1 of the AUTOSAR E2E Protocol Specification.

One or more embodiments may implement deviations (e.g., simplifications) from the AUTOSAR E2E Protocol Specification. For instance, one or more embodiments may rely on: one message counter per frame ID, and/or one error counter to count all mismatches, and/or initializations of the message counter and the error counter as a result of initializing the communication interface (e.g., after power-up, and/or wake-up, and/or exit from a fail-safe mode).

In one or more embodiments, each slave device may generate an outgoing message counter value for outgoing frames, e.g., only for unicast responses sent. End-to-end protection may be checked (only) on frames that are addressed to the slave device and are accepted by the slave device (e.g., having a correct CAN FD frame error check, such as CRC).

In one or more embodiments, an individual E2E message counter may be checked for each CAN ID that is accepted by a slave device (e.g., a message counter for the unicast frames addressed to the slave device, a message counter for the multicast frames addressed to the chain of slaves that the slave device belongs to, a message counter for the broadcast command frames). A respective threshold may be set for each checked message counter. Each slave device may only belong to one multicast chain.

In one or more embodiments, an error counter may count all message counter mismatches above the individual counter mismatch thresholds.

In one or more embodiments, an implemented watchdog mechanism may perform a timeout detection insofar as the slave device does not poll for incoming messages as a function of a cyclic timer.

Figure 2:
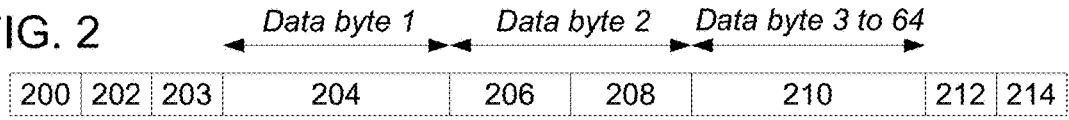
FIG. 2 is exemplary of the content of an end-to-end protected frame in one or more embodiments.

As exemplified in FIG. 2, which is exemplary of the structure of a CAN FD frame with an E2E protection control field, the E2E protection control field may be embedded in the first two data bytes of the CAN FD frame. A CAN FD frame may thus comprise: a standard ID field (SID) 200 (e.g., comprising 11 bits: SID[10:0]), a control field CTRL 202 (e.g., comprising 6 bits), a data length code field 203 (e.g., comprising 4 bits: DLC[3:0]), a first data byte 204 ("Data byte 1"), a second data byte comprising portions 206 and 208 ("Data byte 2"), a set of further data bytes 210 (e.g., 62 data bytes, "Data byte 3" to "Data byte 64"), a CRC field 212 and an ACK/EOF field 214. The first data byte 204 may contain an 8-bit CRC value (CRC[7:0]). The second data byte may comprise a first portion 206 including the low nibble of the high byte of the standard ID field with a leading "0" (i.e., "0", SID[10:8]) and a second portion 208 comprising the counter (e.g., a 4-bit counter COUNTER[3:0]). The first and second data bytes 204, 206, 208 may thus provide the E2E protection control field. The sequence-counter and the alive-counter are identical.

In one or more embodiments, calculating an 8-bit CRC value (CRC[7:0]) may rely on using the polynomial "$1D_{16}$" according CRC-8-SAE J1850, with a start value of $00_{16}$ and a XOR value of $00_{16}$. Information about the CRC calculation, the start and XOR values and ways to check the correctness of the calculation are described in Chapter 6.13 of the AUTOSAR E2E Protocol Specification. In one or more embodiments, the CRC value may be calculated in the following order: SID[7:0], "0", SID[10:8], COUNTER[3:0], remaining data bytes (i.e., "Data byte 3" to "Data byte 64"). The bit stream is calculated from left to right, i.e., in the order the bits are transmitted and received.

Purely by way of example, Table I annexed to the present description illustrates standard parameters for CRC8 computation according to profile 1C of the AUTOSAR E2E Protocol Specification. One or more embodiments may rely on different parameters for the computation of the CRC.

One or more embodiments may involve a message counter for each SID that is sent by the device (be it a master device or a slave device). Since the slave devices may answer only on unicast requests with a unicast SID, (only) one counter for transmitted messages may be provided in a slave device. According to the profile 1C of the AUTOSAR E2E Protocol Specification, the sequence-counter and the alive-counter are identical. Also according to the profile 1C of the AUTOSAR E2E Protocol Specification, the counter may be a 4-bit counter that counts from 0 to 14 and increments to 0 afterwards, i.e., the counter value 15 can be skipped. The counter may be incremented after each sent message and may be reset to 0 after power-up reset, wake-up and when leaving a fail-safe mode. Therefore, the first message sent by a device after reset may use the counter value 0.

The data bytes in FIG. 2 start with "Data byte 1" 204 counting to "Data byte 64", i.e., the E2E protection control field located in the "Data byte 1" 204 is the first byte of the transmitted data (i.e., no Byte 0).

Since in one or more embodiments the SID may be only 11-bit long, the high nibble 206 of the SID may start with a leading "0". Unused data bytes may be filled with $FF_{16}$ to reach a CAN FD block size (e.g., as determined by the DLC code).

Figure 3:
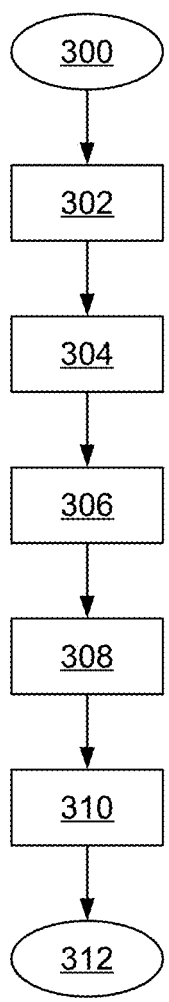
FIG. 3 is a flow diagram exemplary of a procedure for generating an end-to-end control field according to one or more embodiments.

FIG. 3 is a flow diagram exemplary of the generation procedure of an E2E protection control field at the sender side. The procedure may be implemented at the master (controller) side and/or at the slave side.

The procedure of generating an E2E protection control field starts at a start step 300.

Step 302 may comprise storing the value of the outgoing message counter by writing such value to the low nibble 208 of the "Data byte 2".

Step 304 may comprise storing the value of the upper part of the SID by writing the value {0, SID[10:8]} to the first portion 206 of the "Data byte 2".

Step 306 may comprise calculating the CRC value over the sequence SID[7:0], "0", SID[10:8], COUNTER[3:0] followed by the remaining data bytes up to the DLC value (e.g., "Data byte 3" to "Data byte 64").

Step 308 may comprise storing the calculated CRC value in the first data byte 204 "Data byte 1".

Step 310 may comprise increasing the outgoing message counter for the next message.

The procedure of generating an E2E protection control field ends with an end step 312.

In one or more embodiments, the E2E protection control field of received messages can be verified at the receiver side (e.g., at a master device and/or at a slave device, depending on which device is the sender). A frame may be dropped without further action if a non-matching CRC value is detected in the first data byte 204, or if a non-matching low nibble of the SID high byte is detected in the portion 206 of the second data byte.

A respective counter may be used for each SID that is accepted by the device as valid identifier, possibly with some exceptions. The counter may be maintained by the sending device, while the receiving device may store received counter values and compare the newly arrived message values with the stored ones. Afterwards, the received counter value may be stored.

Figure 4:
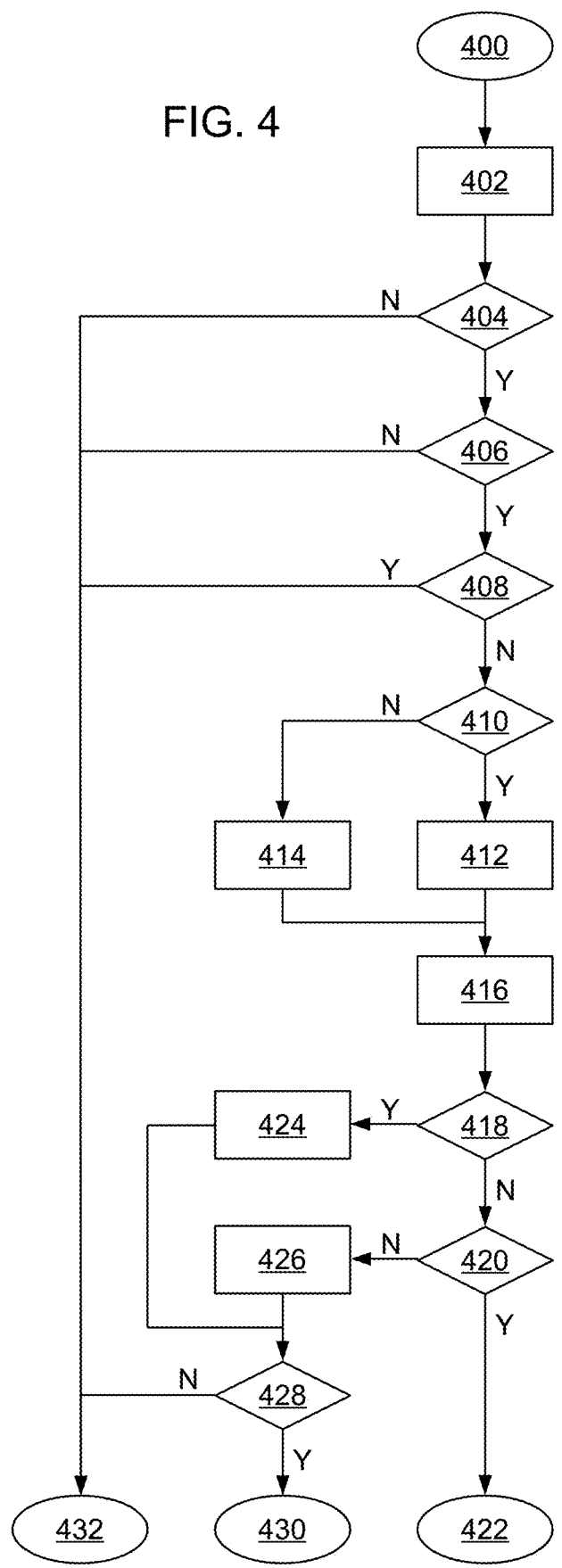
FIG. 4 is a flow diagram exemplary of a procedure for verifying an end-to-end control field according to one or more embodiments.

FIG. 4 is a flow diagram exemplary of the verification flow of an E2E protection control field at the receiver side. Such verification flow may be based on the AUTOSAR E2E Protocol Specification. The procedure of verifying an E2E protection control field starts at a start step 400.

Step 402 may comprise calculating a CRC value over the sequence SID[7:0], "0", SID[10:8], COUNTER[3:0] followed by the remaining data bytes up to the DLC value (e.g., "Data byte 3" to "Data byte 64").

Step 404 may comprise checking whether the CRC value computed at step 402 matches the CRC value stored in the first data byte 204 of the received CAN frame.

In case of a negative outcome (N) of step 404, step 432 may comprise dropping the received message and terminating the procedure of verifying an E2E protection control field.

In case of positive outcome (Y) of step 404, step 406 may comprise checking whether the value of SID[10:8] stored in portion 206 of the second data byte matches the value of SID[10:8] stored in the standard ID field of the received CAN frame, according to AUTOSAR E2E protection. Step 406 may facilitate cross-checking that the data belongs to the right frame. The E2E protection may thus provide a higher safety level than the protocol controller.

In case of a negative outcome (N) of step 406, step 432 may comprise dropping the received message and terminating the procedure of verifying an E2E protection control field.

In case of a positive outcome (Y) of step 406, step 408 may comprise checking whether a message counter value of the received frames RecCnt is equal to a threshold value, the threshold value being equal to the maximum value reachable by the counter as a function of its length in bits. For instance, in the case here exemplified of a 4-bit message counter, step 408 may comprise checking whether RecCnt is equal to 15.

In case of a positive outcome (Y) of step 408, step 432 may comprise dropping the received message and terminating the procedure of verifying an E2E protection control field.

In case of a negative outcome (N) of step 408, step 410 may comprise checking whether the current counter value RecCnt is higher than a last stored counter value LastCnt, i.e., step 410 may comprise checking whether overflow of the frame counter has occurred (negative outcome N of step 410) or not (positive outcome Y of step 410).

In case of a positive outcome (Y) of step 410, step 412 may comprise computing a difference DeltaCnt between the current counter value RecCnt and the last stored counter value LastCnt according to the formula DeltaCnt=RecCnt−LastCnt.

In case of a negative outcome (N) of step 410, step 414 may comprise computing a difference DeltaCnt between the current counter value RecCnt and the last stored counter value LastCnt according to the formula DeltaCnt=($2^n$−1)+RecCent−LastCnt, where n is the number of bits of the counter. For instance, in the case here exemplified of a 4-bit counter, the previous formula may read DeltaCnt=15+RecCnt−LastCnt.

Step 416 may comprise storing the received counter value RecCnt into the last stored counter value LastCnt in order to allow processing of further received frames.

Step 418 may comprise checking whether the value DeltaCnt computed at step 412 or step 414 is equal to zero, i.e., step 418 may comprise checking whether the received message is a repeated message.

In a case of as positive outcome (Y) of step 418, step 424 may comprise increasing an error counter ErrCnt.

In case of a negative outcome (N) of step 418, step 420 may comprise checking whether the value DeltaCnt computed at step 412 or step 414 is equal to or lower than a threshold value MaxDeltaCnt corresponding to a maximum allowed counter difference. Thus, step 420 may comprise checking whether the number of frame losses is within an acceptable range defined by the threshold MaxDeltaCn.

In case of a negative outcome (N) of step 420, step 426 may comprise increasing the error counter ErrCnt.

In case of a positive outcome (Y) of step 420, step 422 may comprise accepting the received message and terminating the procedure of verifying an E2E protection control field.

Following step 424 or step 426, step 428 may comprise checking whether the value of the error counter ErrCnt is equal to or higher than a threshold value MaxErrCnt corresponding to a maximum allowed number of errors.

In case of a negative outcome (N) of step 428, step 432 may comprise dropping the received message and terminating the procedure of verifying an E2E protection control field.

In case of a positive outcome (Y) of step 428, step 430 may comprise dropping the received message, entering a fail-safe state and terminating the procedure of verifying an E2E protection control field.

In one or more embodiments, the last counter value RecCnt may be stored separately at step 416 for each accepted SID. A single error counter (e.g., a 4-bit error counter) may be used for all accepted messages, i.e., errors detected for each SID may increment the same error counter ErrCnt. The error counter ErrCnt and the last counter value LastCnt may be readable by a unicast command (read-only) and may be resettable to o by write access.

Therefore, in one or more embodiments, a sender device may be configured to increase an outgoing counter by a unitary value and adding the counter value to the outgoing message. On the receiving side, the received counter value may be compared to the stored one (e.g., the latest received counter value). If the newly received counter value is higher than the stored one, at least one new message has been sent and received. If the newly received counter value is equal to the stored one, the message has been repeated. If the difference between the newly received counter value and the stored one is higher than unity, some messages have been lost. If the difference between the newly received counter value and the stored one is higher than a certain message counter threshold, a relevant number of messages have been lost and an error counter is increased. If a number of errors exceeding a certain threshold have been counted, some action may be taken by the received device (e.g., entering a fail-safe mode).

Table II annexed to the present description is exemplary of faults that may be detected by the E2E protection control here described, plus additional optional measures (for instance, timeout detection via implementation of a watch-dog mechanism on both sides) and the assumption that all participants on the bus use the same CRC calculation for data protection. In case the implemented CRC is an 8-bit CRC as defined in AUTOSAR profile 1C, the maximum data length supported may be equal to 32 bytes.

In one or more embodiments, unicast messages may be exchanged over the CAN bus. Unicast messages may comprise diagnosis request messages sent from the master device to a slave device, diagnosis response messages sent from a slave device to the master device, burst-read request messages and burst-write messages sent from the master device to a slave device, and burst-read response messages sent from a slave device to the master device.

In one or more embodiments, a master device may request data from a particular slave device by sending a diagnosis request frame. A possible structure of the diagnosis request frame is exemplified in FIG. 5.

Figure 5:
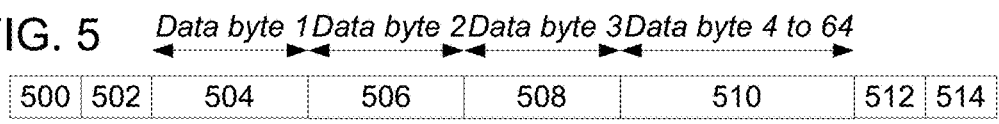

As exemplified in FIG. 5, a diagnosis request frame may comprise: a standard CAN FD ID field 500 (e.g., comprising 11 bits: SID[10:0]), a control field CTRL 502 (e.g., comprising 6 bits), a first data byte 504 ("Data byte 1"), a second data byte 506 ("Data byte 2"), a third data byte 508 ("Data byte 3"), a set of further data bytes 510 (e.g., 61 data bytes, "Data byte 4" to "Data byte 64"), a CRC field 512 and an ACK/EOF field 514. The data bytes 504 and 506 may comprise the E2E protection control field. The third data byte 508 may comprise an OP code (operation code) and an address according to ST SPI 4.0. The OP code may allow read and write operations. For instance, the OP code may define whether data is read back from an address or written into the address.

In particular, the standard ID field 500 may comprise the address of a slave device to which the diagnosis request message is addressed (e.g., a 9-bit address SLAVE[8:0]) preceded by a 2-bit code. The first bit of the 2-bit code (i.e., the MSB of the ID field 500) may be equal to "0" to identify a unicast message (as opposed to multicast messages, which may be identified by the value "1" of the MSB), and the second bit of the 2-bit code may be equal to "1" to identify a master request message (as opposed to a slave response message, which may be identified by the value "0" of the second bit of the 2-bit code).

In case the unicast diagnosis request frame does not contain any data in the data bytes 510, the addressed slave may transmit default diagnosis data defined at implementation. In case the unicast diagnosis request frame contains data in the data bytes 510, such data may be an SPI command according to specification ST SPI 4.1, and the slave device may reply with the data requested by the diagnosis request frame also encoded by the ST SPI 4.1 protocol. With the ST SPI protocol, data can be written into and read from addressed memory locations. Therefore, actuator values can be set, and diagnosis or measurement data can be read back. Read or write mode and additional functions (e.g., access to reserved data) may be indicated by the OP code in the third data byte 508.

In one or more embodiments, a watchdog may be implemented. The watchdog may comprise a timer with a duration of, e.g., 100 ms, 150 ms, 200 ms or 250 ms. These durations may be selected by writing to a dedicated memory address to program which one is selected. An initial value may be written in the non-volatile memory. The timer may be started after power-up reset and can be reset by writing to a memory trigger bit at a specified address. Upon expiration of the timer, the device may enter a fail-safe state. Therefore, during normal operation this dedicated bit can be written by a unicast diagnosis request message with memory write. Optionally, a second earlier time threshold may be defined (e.g., 50 ms). If a watchdog trigger occurs before the second time threshold, the device may enter a fail-safe state. This may facilitate the implementation of a window-watchdog that involves the timer to be reset within a specified time window (e.g., between 50 ms and 100 ms) for more supervision to sense too many watchdog resets. Such a watchdog may facilitate supervision of a correctly working communication interface and/or a correctly working master device.

Figure 6:
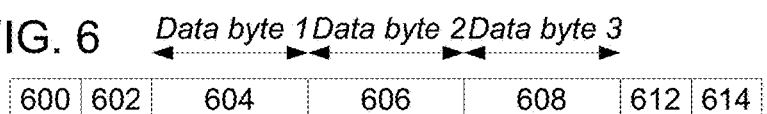

FIG. 6 is exemplary of another possible structure of a diagnosis request frame, in case no data has to be written to the memory of the addressed slave device. Therefore, as exemplified in FIG. 6, the memory content (corresponding to the data bytes 510) may not be sent, and the diagnosis request frame may comprise only a standard ID field 600, a control field CTRL 602, a first data byte 604 ("Data byte 1"), a second data byte 606 ("Data byte 2"), a third data byte 608 ("Data byte 3"), a CRC field 612 and an ACK/EOF field 614, whose content is the same as that of a message as exemplified in FIG. 5.

Unicast diagnosis request frames as exemplified in FIGS. 5 and 6 may be E2E protected by optionally incorporating an E2E protection control field in the data bytes 504, 506 (or 604, 606).

Figure 7:
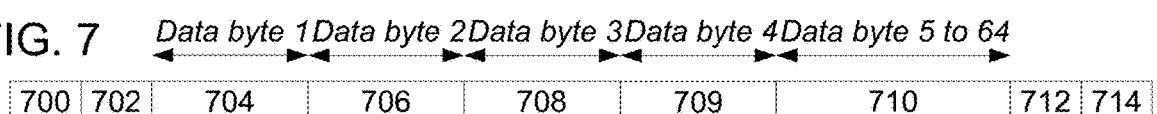

FIG. 7 is exemplary of a possible structure of a diagnosis response frame sent from a slave device to the master device in response to a diagnosis request message.

As exemplified in FIG. 7, a diagnosis response frame may comprise: a standard CAN FD ID field 700 (e.g., comprising 11 bits: SID[10:0]), a control field CTRL 702 (e.g., comprising 6 bits), a first data byte 704 ("Data byte 1"), a second data byte 706 ("Data byte 2"), a third data byte 708 ("Data byte 3"), a fourth data byte 709 ("Data byte 4"), a set of further data bytes 710 (e.g., 60 data bytes, "Data byte 5" to "Data byte 64"), a CRC field 712 and an ACK/EOF field 714. The data bytes 704 and 706 may comprise an E2E protection control field. The third data byte 708 may comprise an OP code (operation code) and an address. The fourth data byte 709 may comprise a Global-Status-Byte (GSB).

In particular, the standard ID field 700 may comprise the address of the slave device which is sending the diagnosis response message (e.g., a 9-bit address SLAVE[8:0]) preceded by a 2-bit code. The first bit of the 2-bit code (i.e., the MSB of the ID field 700) may be equal to "0" to identify a unicast message, and the second bit of the 2-bit code may be equal to "0" to identify a slave response message (as opposed to a master request message, as discussed with reference to FIG. 5).

In one or more embodiments, a slave device may thus answer to a master diagnosis request frame with a diagnosis response frame as exemplified in FIG. 7. In case the diagnosis request frame was sent with data (e.g., according to FIG. 5), the data bytes 709, 710 of the diagnosis response frame may comprise an ST SPI SDO frame, including the Global-Status-Byte (GSB) in the byte 709.

In case the diagnosis request frame was sent without data (e.g., according to FIG. 6), the diagnosis response frame may include the Global-Status-Byte (GSB) 709 only, and the data bytes 710 may not be transmitted.

In one or more embodiments, a master device may read data from a memory of a particular slave device by sending a burst-read request frame, which may have the same structure as a diagnosis request frame. The burst-read response frame sent by the slave device may have a structure similar to the structure of a diagnosis response frame as exemplified in FIG. 7, where the data bytes following the GSB (i.e., the data bytes 710 in FIG. 7) may contain the memory content of the following addresses.

Figure 8:
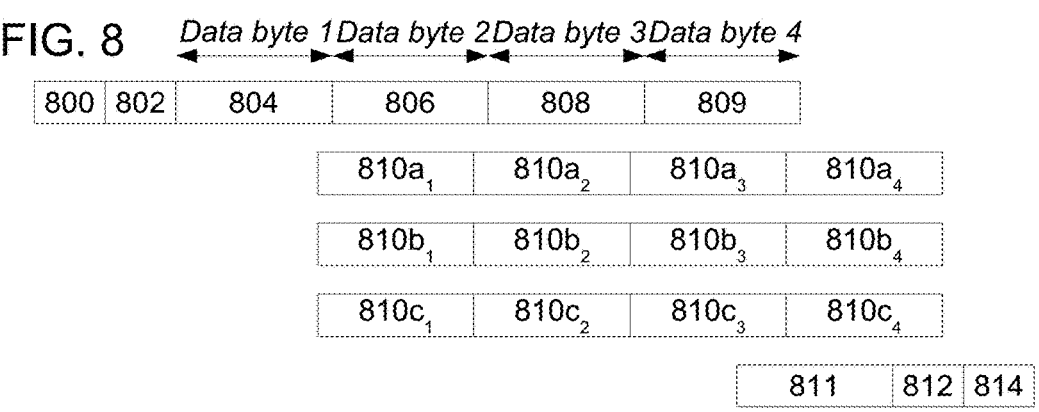

For instance, FIG. 8 is exemplary of a case where the content of three memory addresses with 32 bit each are returned by a slave device in a burst-read response frame. The burst-read response frame may thus contain: a standard CAN FD ID field 800 (e.g., comprising 11 bits: SID[10:0]), a control field CTRL 802 (e.g., comprising 6 bits), a first data byte 804 ("Data byte 1"), a second data byte 806 ("Data byte 2"), a third data byte 808 ("Data byte 3"), a fourth data byte 809 ("Data byte 4"), a set of further data bytes $810a_1$ to $810c_4$ (e.g., 12 data bytes), padding bytes 811, a CRC field 812 and an ACK/EOF field 814.

The standard ID field 800 may comprise the address of the slave device sending data, preceded by a 2-bit code "00". The data bytes 804 and 806 may comprise an E2E protection control field. The third data byte 808 may comprise an OP code (operation code) and an address. The fourth data byte

809 may comprise a Global-Status-Byte (GSB). The further data bytes 810a₁ to 810c₄ may comprise the retrieved memory content. The unused padding bytes 811 to be transmitted to fill the number of bytes according to the DLC field may be filled with value $FF_{16}$ for correct CRC calculation.

In one or more embodiments, a master device may write data to a memory of a particular slave device by sending a burst-write request frame, which may have a structure similar to that of a diagnosis request frame, as exemplified in FIG. 9, where the data bytes following the optional E2E protection control field 906 may contain the content to be stored in the following addresses.

For instance, FIG. 9 is exemplary of a case where three memory addresses with 32 bit each are targeted for writing data therein. The burst-write request frame may thus contain: a standard CAN FD ID field 900 (e.g., comprising 11 bits: SID[10:0]), a control field CTRL 902 (e.g., comprising 6 bits), a first data byte 904 ("Data byte 1"), a second data byte 906 ("Data byte 2"), a set of further data bytes 908a to 910c₄ (e.g., 15 data bytes), padding bytes 911, a CRC field 912 and an ACK/EOF field 914.

The standard ID field 900 may comprise the address of the addressed slave device, preceded by a 2-bit code "01". The data bytes 904 and 906 may comprise an E2E protection control field.

The data byte 908a (respectively, 908b, 908c) may comprise a first (respectively, second, third) OP code (operation code) and a first (respectively, second, third) address. The further data bytes 910a₁ to 910a₄ (respectively, 910b₁ to 910b₄, 910c₁ to 910c₄) may comprise the data to be stored at the respective memory addresses of the slave device. The unused padding bytes 911 to be transmitted to fill the number of bytes according to the DLC field may be filled with value $FF_{16}$ for correct CRC calculation.

In one or more embodiments, a slave device may answer to a burst-write request frame received by sending a burst-write response frame having a structure similar to that of a diagnosis response frame, as exemplified in FIG. 10. By way of contrast with a diagnosis response frame, a burst-write response frame may not comprise data following the GSB byte. A burst-write response frame may thus comprise, as exemplified in FIG. 10: a standard CAN FD ID field 1000, a control field CTRL 1002, a first data byte 1004 ("Data byte 1"), a second data byte 1006 ("Data byte 2"), a third data byte 1008 ("Data byte 3"), a fourth data byte 1009 ("Data byte 4"), a CRC field 1012 and an ACK/EOF field 1014.

The standard ID field 1000 may comprise the address of the slave device which is sending the burst-write response message (e.g., a 9-bit address SLAVE[8:0]) preceded by a 2-bit code "00". The data bytes 1004 and 1006 may comprise an E2E protection control field. The third data byte 1008 may comprise an OP code (operation code) and an address. The fourth data byte 1009 may comprise a Global-Status-Byte (GSB).

In one or more embodiments, multicast messages may be exchanged over the CAN bus. Multicast messages may comprise multicast data messages sent from the master device to a subset of slave devices (e.g., a particular chain) and broadcast command messages sent from the master device to all slave devices.

A possible structure of a multicast data message is exemplified in FIG. 11, and may comprise: a standard CAN FD ID field 1100 (e.g., comprising 11 bits: SID[10:0]), a control field CTRL 1102 (e.g., comprising 6 bits), a first data byte 1104 ("Data byte 1"), a second data byte 1106 ("Data byte 2"), a set of further data bytes 1110 (e.g., 62 data bytes, "Data byte 3" to "Data byte 64"), a CRC field 1112 and an ACK/EOF field 1114.

The standard ID field 1100 may comprise an identification number of a chain of slaves to which the multicast data message is addressed (e.g., a 7-bit chain identifier CHAIN[6:0]) preceded by code "1111". Use of a 7-bit chain identifier allows the assignment of 128 chains with up to 62 members each. The data bytes 1104 and 1106 may comprise an E2E protection control field.

In one or more embodiments, the MSB of the chain identifier CHAIN[6:0] may be used to identify different address spaces (e.g., different sets of memory locations) in the slaves to which the data belongs to. For example, a slave device may be assigned to chain b'000_0000. A multicast data message sent to chain b'000_0000 may assign data to one address space in the slave devices, while a multicast data message sent to chain b'100_0000 may assign data to a second address space in the same chain. Optionally, more than one MSB of the chain identifier CHAIN[6:0] may be used as address space indicator.

In one or more embodiments, each slave device belonging to the addressed chain may pick its data from the data bytes 1110 transferred by the frame. The number of data bits addressed to each slave device may be defined by the implementation of the function. For instance, the chain a slave device belongs to and the position in a multicast message from which the slave device picks its data may be stored in a non-volatile memory of each slave device.

Optionally, a multicast data message can be end-to-end protected.

A possible structure of a broadcast command message is exemplified in FIG. 12, and may comprise: a standard CAN FD ID field 1200 (e.g., comprising 11 bits: SID[10:0]), a control field CTRL 1202 (e.g., comprising 6 bits), a first data byte 1204 ("Data byte 1"), a second data byte 1206 ("Data byte 2"), a third data byte 1208 ("Data byte 3"), a set of further data bytes 1210 (e.g., 61 data bytes, "Data byte 4" to "Data byte 64"), a CRC field 1212 and an ACK/EOF field 1214.

The standard ID field 1200 may comprise a dedicated identification code, e.g., "110_0110_0110". The data bytes 1204 and 1206 may comprise an E2E protection control field.

A broadcast command message as exemplified in FIG. 12 may send one or more commands to all slave devices, which may involve all devices to react on the same received message. For example, all slave devices may be commanded to enter a sleep mode after a go-to-sleep command. A next CAN FD frame may wake them up again. Another broadcast command message may be used to synchronize all slaves on the same CAN FD frame. The specific command may be encoded in the third data byte 1208 ("Data byte 3"), after the optional end-to-end protection bytes. The master device may not expect an answer from the slave devices upon sending broadcast command messages.

Table III annexed to the present description is exemplary of possible commands transmitted by a broadcast command message.

It is noted that data message handling functions as exemplified herein (e.g., end-to-end protection) may be used in any communication system. For instance, such functions may be used in CAN FD Light applications or in full CAN FD monolithic implementation. Alternatively, other communication protocols may be provided with such data message handling functions, e.g., a full monolithic integration of an Ethernet protocol (e.g., upcoming 10BASE-T1S).

In one or more embodiments, a chain initialization broadcast frame may be sent to all slave devices to inform them about the chain they belong to and their position within this chain, so that each slave is able to pick the data intended for it from a multicast data message. The number of bits to pick may be the same for every slave, and defined at implementation.

For instance, FIG. 13 is exemplary of a structure of a chain initialization frame, comprising: a CAN FD ID field 1300 (e.g., comprising 11 bits: SID[10:0]), a control field CTRL 1302 (e.g., comprising 6 bits), a first data byte 1304 ("Data byte 1"), a second data byte 1306 ("Data byte 2"), a third data byte 1308 ("Data byte 3"), a set of further data bytes 1310 (e.g., 61 data bytes, "Data byte 4" to "Data byte 64"), a CRC field 1312 and an ACK/EOF field 1314. The ID field 1300 may comprise an ID identifying the chain initialization frame, such as "1_1110_000000". The first three data bytes 1304, 1306, 1308 may comprise the information addressed to a slave and useful to identify the chain it belongs to, its position in the chain and the addressed slave. For instance, the first data byte 1304 may comprise the identification number of a chain (e.g., a 7-bit number CHAIN[6:0]) followed by a "0". The second data byte 1306 may comprise the position of the slave in the chain (e.g., a 5-bit number POS[4:0]) followed by two zero values "00" and the MSB of the slave ID (e.g., SLAVE_ID[8]). The third data byte 1308 may comprise the remaining bits of the slave ID (e.g., SLAVE_ID[7:0]). The further data bytes 1310 may replicate, in groups of three, the structure of bytes 1304, 1306, 1308 for configuring other slaves in the chain. Therefore, with 64 data bytes in a chain initialization frame, twenty slave devices can be programmed in one CAN FD frame.

Additionally or alternatively, in one or more embodiments the chain ID of a slave device may be stored in a non-volatile memory of the slave device at production.

Optionally, a control bit may be provided in a slave device to switch between a first initialization mode, wherein the slave device is initialized upon receiving a chain initialization frame, and a second initialization mode, wherein the slave device is initialized based on data stored in the respective non-volatile memory at production.

In certain cases, due to the frequency offset between a responding slave and the master, some other slaves may not be able to correctly receive frames sent by the master after a slave response issued on the bus. Thus, in one or more embodiments a synchronization frame may be sent to all slaves by the master, e.g., after each slave response message, to improve synchronization of all slave devices to the master device. The slave devices will synchronize on this frame and drop its content, insofar as the synchronization message may not contain an ID that the slave devices are able to recognize.

For instance, FIG. 14 is exemplary of a structure of a synchronization frame, comprising: a CAN FD ID field 1400 (e.g., comprising 11 bits: SID[10:0]), a control field CTRL 1402 (e.g., comprising 6 bits), a CRC field 1412 and an ACK/EOF field 1414. The ID field 1300 may comprise a corresponding ID such as "1_010_101_0101". The control field CTRL may be set to the value "001000". The DLC may be equal to 0000.

In one or more embodiments, a sleep/wake-up feature may be implemented according to ISO 11898-2:2016 pattern wake-up.

For instance, the slave devices may be all sent to a sleep mode by a broadcast command message as previously described with reference to FIG. 12 and Table III.

In one or more embodiments, all the slave devices in the network may be woken up by a wake-up pattern frame whose data in the payload satisfies the wake-up pattern requirements of ISO 11898-2 with $T_{Filter}$(short) at 1 Mb/s. For lower bit rates, $T_{Filter}$(long) may be used. The wake-up pattern may be repeated or enhanced in the optional additional data bytes of the wake-up pattern frame.

For instance, FIG. 15 is exemplary of a structure of a wake-up pattern frame, comprising: a CAN FD ID field 1500 (e.g., comprising 11 bits: SID[10:0]), a control field CTRL 1502 (e.g., comprising 6 bits), a first data byte 1504 ("Data byte 1"), a set of further optional data bytes 1510 (e.g., 7 data bytes, "Data byte 2" to "Data byte 8"), a CRC field 1512 and an ACK/EOF field 1314. The ID field 1500 may comprise a corresponding ID such as "1_000_011_1100". The control field CTRL may be set to the value "001000". The DLC may be equal to 1000. The slave devices may recognize a dominant-recessive-dominant pulse where the three individual frames are longer than a specified filter time. Thus, the data field of a wake-up pattern frame as exemplified in FIG. 15 may be used to implement a bit pattern that satisfies this requirement. For instance, the first data byte 1504 may be equal to "1111_1110" and each of the remaining data bytes 1510 may be equal to "0000_1111".

Optionally, selective wake-up/sleep frames may be implemented. A dedicated bit in the memory of each slave device may activate a selective sleep mode. Such dedicated bit may be programmed in the non-volatile memory of the slave device, fixed at production or configured by register access during operation.

If selective sleep mode is activated, another bit in the memory may define if the slave enters sleep mode or stays awake upon receiving a "go to sleep" broadcast command message. Therefore, in one or more embodiments some slave devices may be set in a state in which they do not enter sleep mode. Possible applications of this feature may comprise, for instance, parking lights for a vehicle, which stay awake while the other drivers enter sleep mode.

Therefore, in one or more embodiments, multicast wake-up frames may be configured to wake-up devices that are in selective sleep mode. Such selective wake-up frames may be implemented according to ISO 11898-2:2016 with the exception that a slave device wakes up only upon a SID equal to "10" followed by a wake-up frame ID (e.g., a 9-bit wake-up frame ID_WUFID[8:0]). Mask bits may not be supported and the selective wake-up frame may be a CAN FD frame. For each slave device supporting the selective wake-up functionality, a respective wake-up frame ID may be defined. In one or more embodiments, slave devices may be selectively woken up in groups by assigning the same wake-up frame ID to them. The wake-up frames may not be end-to-end protected.

For instance, FIG. 16 is exemplary of a structure of a selective wake-up frame, comprising: a CAN FD ID field 1600 (e.g., comprising 11 bits: SID[10:0]), a control field CTRL 1602 (e.g., comprising 6 bits), a CRC field 1612 and an ACK/EOF field 1614. The ID field 1600 may comprise a wake-up frame ID_WUFID[8:0] preceded by values "10".

It is noted that data link layer functions as exemplified herein (e.g., synchronization frames, wake-up frames, selective sleep mode) may be used in any CAN or CAN FD system, e.g., in full CAN FD monolithic implementations. In general, the unicast request/response scheme is not restricted to a master-slave communication architecture. A unicast request may just request data from another device. Additionally, a unicast request may write data into a specific device. This may include, for instance, triggering a watchdog and/or expecting response data within a determined time interval.

It is noted that, in one or more embodiments, one or more of the frames exemplified with reference to FIGS. 5 to 16 may comprise a data length code field (e.g., comprising 4 bits: DLC[3:0]). For instance, the data length code field may be located between a control field CTRL and the data bytes of the frame (e.g., a payload portion of the frame).

Purely by way of example, Table IV annexed to the present description exemplifies possible messages exchanged in a bus communication network according to one or more embodiments.

As exemplified herein, a method may comprise coupling a first device (e.g., 10) and a set of second devices (e.g., 20$_1$, ..., 20$_n$) to a CAN communication bus (e.g., 30) via respective CAN transceiver circuits to exchange messages over the CAN communication bus. The method may comprise configuring the first device as a communication master device to transmit via the CAN communication bus first messages carrying a set of operation data message portions indicative of operations for implementation by second devices in the set of second devices, and second messages addressed to second devices in the set of second devices. The second messages may convey identifiers identifying respective ones of the second devices to which the second messages are addressed, requesting respective reactions towards the first device within respective expected reaction intervals. The method may comprise configuring the second devices in the set of second devices as communication slave devices to receive via the CAN communication bus the first messages transmitted from the first device configured as communication master device, read respective operation data message portions in the set of operation data message portions and implement respective operations as a function of the respective operation data message portions read, and to receive via the CAN communication bus the second messages transmitted from the first device configured as communication master device and react thereon within the respective expected reaction intervals by transmitting via the CAN communication bus reaction messages towards the first device configured as communication master device.

As exemplified herein, a method may comprise configuring the respective CAN transceiver circuits to (e.g., selectively) set the CAN communication bus to a recessive level (e.g., a logic 1) during transmission of the messages via the CAN communication bus by the respective first device or second device.

As exemplified herein, a method may comprise configuring the respective CAN transceiver circuits to operate in a data transmission operation mode (e.g., a mode used during the data phase of a CAN frame) during transmission of the messages via the CAN communication bus by the respective first device or second device.

As exemplified herein, the first messages sent by the first device may comprise synchronization messages indicative of a clock synchronization operation for implementation by the second devices in the set of second devices. The synchronization messages may convey a respective synchronization identifier, and the method may comprise configuring the first device to transmit via the CAN communication bus a synchronization message in response to a reaction message transmitted by a second device in the set of second devices being received at the first device, and configuring the second devices in the set of second devices to synchronize respective clock signals in response to a synchronization message being received.

As exemplified herein, a method may comprise:
enabling the second devices in the set of second devices to selectively switch between an active state and an inactive state as a function of at least one respective sleep mode configuration bit stored in a respective memory of the second device,
configuring the first device to transmit via the CAN communication bus de-activation messages for de-activating the second devices in the set of second devices,
configuring the second devices in the set of second devices to switch to the inactive state in response to a de-activation message being received and as a function of the at least one respective sleep mode configuration bit,
configuring the first device to transmit via the CAN communication bus activation messages for activating the second devices in the set of second devices, and
configuring the second devices in the set of second devices to switch to the active state in response to an activation message being received.

As exemplified herein, the activation messages may convey a payload portion comprising a dominant-recessive-dominant pulse (e.g., e.g., according to ISO11898-2).

As exemplified herein, a method may comprise configuring the first device to transmit via the CAN communication bus selective wake-up messages waking-up respective subsets of second devices in the set of second devices. A selective wake-up message may convey a respective selective wake-up identifier (e.g., 1600) indicative of a subset of second devices in the set of second devices to which it is addressed. The method may comprise configuring the subsets of second devices in the set of second devices to switch to the active state in response to a respective selective wake-up message being received.

As exemplified herein, a method may comprise configuring the first device to transmit via the CAN communication bus first messages including a synchronization command for implementation by the second devices in the set of second devices.

As exemplified herein, a method may comprise including in the messages exchanged over the CAN communication bus respective identification fields carrying an identification string selected out of a set of identification strings, the identification string being indicative of an originator device which originates the message and at least one destination device to which the message is addressed. The method may comprise configuring the first device to count a respective number of messages sent by the first device having a respective identification string, and include the respective count number in the messages sent by the first device having the respective identification string. The method may comprise configuring the second devices in the set of second devices to process a subset of the messages exchanged via the communication bus as a function of the respective identification string, compare (e.g., 410, 412, 414) the respective count number included in a received message having a respective identification string to a previously stored count number included in a previously received message having the respective identification string, produce (e.g., 424, 426) a global error count as a function of the comparing, compare (e.g., 428) the global error count to a threshold error value, and enter (e.g., 430) a fail-safe mode in response to the global error count being higher than the threshold error value.

As exemplified herein, a method may comprise configuring the second devices in the set of second devices to count a number of messages sent by the second device having a respective identification string, and include the respective count number in the messages sent by a second device in the set of second devices having the respective identification string. The method may comprise configuring the first device to process a subset of the messages exchanged via the communication bus as a function of the respective identification string, compare the respective count number included in a received message having a respective identification string to a previously stored count number included in a previously received message having the respective identification string, produce a global error count as a function of the comparing, compare the global error count to a threshold error value, and react in response to the global error count being higher than the threshold error value.

As exemplified herein, the global error count may comprise a respective difference computed, for each identification string in a subset of identification strings, between the count number included in a received message having the respective identification string and the previously stored count number included in a previously received message having the respective identification string. The global error count may comprise an increase in the global count number as a result of the computed difference being equal to zero, and/or the computed difference being higher than a threshold difference value.

As exemplified herein, a method may comprise configuring the first device and the second devices in the set of second devices to transmit end-to-end protected messages. An end-to-end protected message may comprise a control field (e.g., 204, 206, 208) having a control value stored therein, the control value comprising the respective message count number (e.g., 208), a portion of the identification string of the end-to-end protected message (e.g., 206), and a respective CRC value (e.g., 204).

As exemplified herein, a method may comprise computing the respective CRC value as a function of the identification string, the message count number and data carried in a payload section of the end-to-end protected message.

As exemplified herein, a method may comprise configuring the second devices in the set of second devices to ignore a received message as a result of the CRC value stored in the control value of the received message being different from a CRC value computed by the at least one second device, and/or the portion of the identification string of the received message stored in the control field of the received message being different from the corresponding portion of the identification string of the received message stored in the identification field of the received message.

As exemplified herein, the second messages addressed to second devices in the set of second devices may comprise burst-write request messages. A burst-write request message may comprise a set of memory addresses (e.g., 908a, . . . , 908c) indicative of memory locations in a memory of the respective second device to which the burst-write request message is addressed, and a respective set of data bytes (e.g., 910$a_1$, . . . , 910$c_4$) to be stored at the memory locations. A method may comprise configuring the respective second device to which the burst-write request message is addressed to store the data bytes at the memory locations and transmit a burst-write response message as a result of receiving a burst-write request message.

As exemplified herein, the second messages addressed to second devices in the set of second devices may comprise burst-read request messages. A burst-read request message may comprise a set of memory addresses indicative of memory locations in a memory of a respective second device to which the burst-read request message is addressed.

A method may comprise configuring the second devices in the set of second devices to transmit a burst-read response message as a result of receiving a burst-read request message. A burst-read response message may comprise a respective set of data bytes (e.g., 810$a_1$, . . . , 810$c_4$) retrieved from the memory locations.

As exemplified herein, a system may comprise a first device and a set of second devices coupled via respective CAN transceiver circuits to a CAN communication bus. The first device and the second devices may be configured as master device and slave devices, respectively, the master device and the slave devices configured to operate with the method of one or more embodiments.

As exemplified herein, a device (e.g., 10) may comprise a CAN transceiver circuit configured for coupling the device as a first device to a set of second devices via a CAN communication bus. The device may be configured to transmit via the CAN communication bus first messages carrying a set of operation data message portions indicative of operations for implementation by second devices in the set of second devices, and second messages addressed to second devices in the set of second devices, the second messages conveying identifiers identifying respective ones of the second devices to which the second messages are addressed requesting respective reactions towards the first device within respective expected reaction intervals. The CAN transceiver circuit may be configured to (e.g., selectively) set the CAN communication bus to a recessive level during transmission of the messages via the CAN communication bus by the device.

As exemplified herein, a device (e.g., 20) may comprise a CAN transceiver circuit configured for coupling the device as a second device to a first device via a CAN communication bus. The device may be configured to receive via the CAN communication bus the first messages transmitted from the first device configured as communication master device, read respective operation data message portions in the set of operation data message portions and implement respective operations as a function of the respective operation data message portions read, and receive via the CAN communication bus the second messages transmitted from the first device configured as communication master device and react thereon within the respective expected reaction intervals by transmitting via the CAN communication bus reaction messages towards the first device configured as communication master device. The CAN transceiver circuit may be configured to (e.g., selectively) set the CAN communication bus to a recessive level during transmission of the messages via the CAN communication bus by the device.

As exemplified herein, a vehicle (e.g., V) may be equipped with a system according to one or more embodiments.

Without prejudice to the underlying principles, the details and embodiments may vary, even significantly, with respect to what has been described by way of example only, without departing from the extent of protection.

The extent of protection is determined by the annexed claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

TABLE I

| Property | Value |
|---|---|
| CRC result width | 8 bits |
| Polynomial | $1D_{16}$ |
| Initial value | $00_{16}$ |
| Input data reflected | No |
| Result data reflected | No |
| XOR value | $00_{16}$ |
| Check | $37_{16}$ |
| Magic Check | $00_{16}$ |

TABLE II

| E2E Mechanism | Detected communication faults |
|---|---|
| Counter | Repetition |
| | Loss |
| | Insertion |
| | Incorrect sequence |
| | Blocking |
| Transmission on a regular basis and timeout monitoring using E2E-Supervision (including watchdog) | Loss |
| | Delay |
| | Blocking |
| Data ID + CRC | Masquerade and incorrect addressing |
| | Insertion |
| CRC | Corruption |
| | Asymmetric information |

TABLE III

| Command | Command byte value | Remark |
|---|---|---|
| Go to sleep | $01_H$ | Sends all devices on the bus to sleep |
| Synchronize PWM | $02_H$ | Resets all PWM counters in all devices |

TABLE IV

| SID | Frame Type | E2E Protection (Optional) | Purpose | Remark |
|---|---|---|---|---|
| {"01", Slave ID[8:0]} | Unicast Frame | Yes | Master: Diagnosis Request | ST SPI Protocol in data field |
| {"00", Slave ID[8:0]} | Unicast Frame | Yes | Slave: Diagnosis Response | ST SPI Protocol in data field |
| {"1111", chain#[6:0]} | Multicast Frame | Yes | Send multicast data to a specific chain of devices | Chain members pick their data from the data field |
| "110_0110_0110" DLC = "xxxx" | Broadcast Frame | Yes | Sends a command to all devices on the bus | Broadcast frame to send defined commands to all devices on the bus (e.g., PWM synchronization or go-to-sleep) |
| "001_1100_0111" DLC = "xxxx" | Broadcast Frame | No | Wake-Up Pattern | Reserved SID. Frames with this SID are ignored. |
| {"10", WUF ID [8:0]} DLC = "0000" | Multicast Frame | No | Wake-up Frame (WUF) | Dedicated SID. Can be the same for a plurality of devices. |

What is claimed is:

1. A method, comprising:
coupling a first device and a set of second devices to a controller area network (CAN) communication bus via respective CAN transceiver circuits to exchange messages over the CAN communication bus;
configuring the first device as a communication master device to transmit, via the CAN communication bus:
first messages carrying a set of operation data message portions indicative of operations for implementation by second devices in the set of second devices; and
second messages addressed to the second devices in the set of second devices, the second messages conveying identifiers identifying respective ones of the second devices in the set of second devices to which the second messages are addressed requesting respective reactions towards the first device within respective expected reaction intervals;
configuring the second devices in the set of second devices as communication slave devices to:
receive via the CAN communication bus the first messages transmitted from the first device configured as communication master device, read respective operation data message portions in the set of operation data message portions and implement respective operations as a function of the respective operation data message portions read; and
receive via the CAN communication bus the second messages transmitted from the first device configured as the communication master device and react thereon within the respective expected reaction intervals by transmitting via the CAN communication bus reaction messages towards the first device configured as the communication master device; and
configuring the respective CAN transceiver circuits to actively drive the CAN communication bus to recessive and dominant levels during transmission of the entire messages via the CAN communication bus by the respective first device or second device in the set of second devices.

2. The method of claim 1, further comprising configuring the respective CAN transceiver circuits to operate in a data transmission operation mode during transmission of the messages via the CAN communication bus by the respective first device or second device in the set of second devices.

3. The method of claim 1, wherein the first messages sent by the first device comprise synchronization messages indicative of a clock synchronization operation for implementation by the second devices in the set of second devices, and the synchronization messages convey a respective synchronization identifier, the method comprising:
configuring the first device to transmit via the CAN communication bus a synchronization message in response to a reaction message transmitted by a second device in the set of second devices being received at the first device; and configuring the second devices in the set of second devices to synchronize respective clock signals in response to the synchronization message being received.

4. The method of claim 1, further comprising:

enabling the second devices in the set of second devices to selectively switch between an active state and an inactive state as a function of at least one respective sleep mode configuration bit stored in a respective memory of the second devices in the set of second devices;

configuring the first device to transmit via the CAN communication bus de-activation messages for de-activating the second devices in the set of second devices;

configuring the second devices in the set of second devices to switch to the inactive state in response to a de-activation message being received and as a function of the at least one respective sleep mode configuration bit;

configuring the first device to transmit via the CAN communication bus activation messages for activating the second devices in the set of second devices; and configuring the second devices in the set of second devices to switch to the active state in response to receiving an activation message conveying a payload portion comprising a dominant-recessive-dominant pulse.

5. The method of claim 4, further comprising:

configuring the first device to transmit via the CAN communication bus selective wake-up messages waking-up respective subsets of second devices in the set of second devices, each selective wake-up message conveying a respective selective wake-up identifier indicative of the respective subset of second devices in the set of second devices to which the respective selective wake-up identifier is addressed; and configuring the respective subsets of second devices in the set of second devices to switch to the active state in response to a respective selective wake-up message being received.

6. The method of claim 1, further comprising configuring the first device to transmit via the CAN communication bus first messages including a synchronization command for implementation by the second devices in the set of second devices.

7. The method of claim 1, further comprising:

including in the messages exchanged over the CAN communication bus respective identification fields carrying an identification string selected out of a set of identification strings, the identification string being indicative of an originator device which originates the message and at least one destination device to which the message is addressed;

configuring the first device to count a respective count number of messages sent by the first device having a respective identification string, and include the respective count number in the messages sent by the first device having the respective identification string; and configuring the second devices in the set of second devices to:

process a subset of the messages exchanged via the CAN communication bus as a function of the respective identification string;

compare the respective count number included in a received message having a respective identification string to a previously stored count number included in a previously received message having the respective identification string;

produce a global error count as a function of the comparing;

compare the global error count to a threshold error value; and enter a fail-safe mode in response to the global error count being higher than the threshold error value.

8. The method of claim 7, further comprising:

configuring the second devices in the set of second devices to count a respective second count number of messages sent by the second devices in the set of second devices having a respective identification string, and include the second respective count number in the messages sent by a second device in the set of second devices having the respective identification string; and configuring the first device to:

process a subset of the messages exchanged via the CAN communication bus as a function of the respective identification string;

compare the second respective count number included in a received message having a respective identification string to a previously stored second count number included in a previously received message having the respective identification string;

produce a global error count as a function of the compare;

compare the global error count to a second threshold error value; and react in response to the global error count being higher than the second threshold error value.

9. The method of claim 7, wherein the global error count comprises:

a respective difference computed, for each identification string in a subset of identification strings, between the respective count number included in a received message having the respective identification string and the previously stored count number included in the previously received message having the respective identification string; and an increase in the respective count number as a result of the computed difference being equal to zero, and/or the computed difference being higher than a threshold difference value.

10. The method of claim 7, further comprising configuring the first device and the second devices in the set of second devices to transmit end-to-end protected messages, an end-to-end protected message comprising a control field having a control value stored therein, the control value comprising the respective count number, a portion of the identification string of the end-to-end protected message, and a respective cyclic redundancy check (CRC) value.

11. The method of claim 10, further comprising computing the respective CRC value as a function of the identification string, the respective count number and data carried in a payload section of the end-to-end protected message.

12. The method of claim 10, further comprising configuring the second devices in the set of second devices to ignore a received message as a result of:

the respective CRC value stored in the control field of the received message being different from a computed CRC value computed by at least one of the second devices in the set of second devices; and/or the portion of the identification string of the received message stored in the control field of the received message being different from a corresponding portion of the identification string of the received message stored in the respective identification field of the received message.

13. The method of claim 1, wherein:
the second messages addressed to second devices in the set of second devices comprise burst-write request messages;
each burst-write request message comprises:
 a set of memory addresses indicative of memory locations in a memory of a respective second device in the set of second devices to which each burst-write request message is addressed; and
 a respective set of data bytes to be stored at the memory locations; and
the method comprises configuring the respective second device in the set of second devices to which each burst-write request message is addressed to store the data bytes at the memory locations and transmit a burst-write response message as a result of receiving each burst-write request message.

14. The method of claim 1, wherein:
the second messages addressed to second devices in the set of second devices comprise burst-read request messages;
each burst-read request message comprises a set of memory addresses indicative of memory locations in a memory of a respective second device in the set of second devices to which each burst-read request message is addressed; and
the method comprises configuring the second devices in the set of second devices to transmit a burst-read response message as a result of receiving each burst-read request message, wherein a burst-read response message comprises a respective set of data bytes retrieved from the memory locations.

15. A system comprising:
a controller area network (CAN) communication bus;
a first device, coupled via a respective CAN transceiver circuit to the CAN communication bus, wherein the first device is configured as a communication master device to transmit, via the CAN communication bus:
 first messages carrying a set of operation data message portions indicative of operations for implementation by second devices in a set of second devices; and
 second messages addressed to the second devices in the set of second devices, the second messages conveying identifiers identifying respective ones of the second devices in the set of second devices to which the second messages are addressed requesting respective reactions towards the first device within respective expected reaction intervals; and
the set of second devices, coupled via respective CAN transceiver circuits to the CAN communication bus, wherein the second devices are configured as communication slave devices to:
 receive, via the CAN communication bus, the first messages transmitted from the first device configured as the communication master device, read respective operation data message portions in the set of operation data message portions and implement respective operations as a function of the respective operation data message portions read; and
 receive, via the CAN communication bus, the second messages transmitted from the first device configured as the communication master device and react thereon within the respective expected reaction intervals by transmitting via the CAN communication bus reaction messages towards the first device configured as the communication master device;
wherein the respective CAN transceiver circuits are configured to actively drive the CAN communication bus to recessive and dominant levels during transmission of the entire messages via the CAN communication bus by the respective first device or second device in the set of second devices.

16. The system of claim 15, wherein the system is a vehicle.

17. A first device comprising:
a controller area network (CAN) transceiver circuit configured to couple the first device to a set of second devices via a CAN communication bus; and
a microcontroller coupled to the CAN transceiver circuit, and configured to transmit, via the CAN communication bus:
 first messages carrying a set of operation data message portions indicative of operations for implementation by second devices in the set of second devices; and
 second messages addressed to the second devices in the set of second devices, the second messages conveying identifiers identifying respective ones of the second devices in the set of second devices to which the second messages are addressed requesting respective reactions towards the first device within respective expected reaction intervals;
wherein the CAN transceiver circuit is further configured to actively drive the CAN communication bus to recessive and dominant levels during transmission of the entire messages via the CAN communication bus by the first device.

18. The first device of claim 17, wherein the first messages sent by the first device comprise synchronization messages indicative of a clock synchronization operation for implementation by the second devices in the set of second devices, wherein the synchronization messages convey a respective synchronization identifier, and wherein the microcontroller is configured to:
 transmit via the CAN communication bus a synchronization message in response to a reaction message transmitted by one of the second devices in the set of second devices being received at the first device;
 transmit via the CAN communication bus activation messages for activating the second devices in the set of second devices; and
 transmit via the CAN communication bus de-activation messages for de-activating the second devices in the set of second devices.

19. A second device comprising:
a driver circuit; and
a controller area network (CAN) transceiver circuit coupled to the driver circuit, and configured to:
 couple the second device to a first device via a CAN communication bus;
 receive via the CAN communication bus first messages transmitted from the first device configured as a communication master device, the first messages carrying operation data message portions indicative of operations for implementation by the second device;
 read the operation data message portions;
 implement respective operations as a function of the operation data message portions;

receive via the CAN communication bus second messages transmitted from the first device, the second messages conveying an identifier identifying the second device and requesting reactions towards the first device within respective expected reaction intervals;

react to the second messages within the respective expected reaction intervals by transmitting via the CAN communication bus reaction messages towards the first device; and actively drive the CAN communication bus to recessive and dominant levels during transmission of the entire messages via the CAN communication bus by the second device.

20. The second device of claim 19, wherein the first messages sent by the first device comprise synchronization messages indicative of a clock synchronization operation for implementation by the second device, wherein the synchronization messages convey a respective synchronization identifier, and wherein the second device is configured to:

synchronize respective clock signals in response to the synchronization message being received;

selectively switch between an active state and an inactive state as a function of at least one respective sleep mode configuration bit stored in a memory of the second device;

switch to the active state in response to receiving an activation message conveying a payload portion comprising a dominant-recessive-dominant pulse; and switch to the inactive state in response to a de-activation message being received and as a function of the at least one respective sleep mode configuration bit.

* * * * *